United States Patent [19]

Wiernicki

[11] Patent Number: 4,662,827
[45] Date of Patent: May 5, 1987

[54] WET MOTOR GEROTER FUEL PUMP

[75] Inventor: Michael V. Wiernicki, Trumansburg, N.Y.

[73] Assignee: Facet Enterprises, Inc., Tulsa, Okla.

[21] Appl. No.: 843,936

[22] Filed: Mar. 24, 1986

Related U.S. Application Data

[63] Continuation of Ser. No. 603,564, Apr. 25, 1984, abandoned.

[51] Int. Cl.⁴ .................... F04B 23/14; F04B 17/00
[52] U.S. Cl. ................................ 417/363; 417/366; 418/182; 403/359
[58] Field of Search ............... 417/366, 410, 363, 424; 418/171, 182; 384/202; 403/359; 310/154, 54, 59

[56] References Cited

U.S. PATENT DOCUMENTS

| | | | |
|---|---|---|---|
| 2,124,234 | 7/1938 | McCormack | 417/410 |
| 2,335,284 | 11/1943 | Kendrick | 418/182 X |
| 2,513,227 | 6/1950 | Wylie | 310/154 |
| 2,525,695 | 10/1950 | Lombard | 403/359 X |
| 2,966,118 | 12/1960 | McAlvay | 418/171 X |
| 3,267,862 | 8/1966 | Mosbacher | 418/171 X |
| 3,418,991 | 12/1968 | Shultz et al. | 417/423 R X |
| 3,696,044 | 7/1976 | Fussner et al. | 417/366 X |
| 4,181,473 | 1/1980 | Ina | 417/540 X |
| 4,209,284 | 6/1980 | Lochmann et al. | 417/366 |
| 4,355,250 | 10/1982 | Langdon | 384/192 X |
| 4,361,419 | 11/1982 | Vohringer | 418/171 X |
| 4,395,142 | 7/1983 | Lobeck | 384/192 |
| 4,447,192 | 5/1984 | Tuckey | 417/366 X |
| 4,500,270 | 2/1985 | Tuckey | 418/171 X |

FOREIGN PATENT DOCUMENTS

| | | | |
|---|---|---|---|
| 1528997 | 5/1970 | Fed. Rep. of Germany | 418/171 |
| 2814659 | 10/1979 | Fed. Rep. of Germany | 418/182 |
| 56154313 | 3/1983 | Japan | 417/424 |
| 1398079 | 6/1975 | United Kingdom | 417/366 |

Primary Examiner—Carlton R. Croyle
Assistant Examiner—Theodore Olds
Attorney, Agent, or Firm—Remy J. VanOphem

[57] ABSTRACT

A wet motor gerotor fuel pump for pumping fuel from a fuel source to an internal combustion engine. The fuel pump includes a pump case having an inlet chamber, a motor chamber, and a pump chamber therebetween. An inlet housing provides appropriate fuel inlet to a gerotor pump in the pump chamber. An outlet housing receives the pressurized fuel and delivers the fuel to the internal combustion engine. An electric motor mounted in the motor chamber is adapted to pass the fuel therethrough such that the fuel is pumped substantially through the gerotor pump along a flow axis through the complete pump assembly to the internal combustion engine.

10 Claims, 20 Drawing Figures

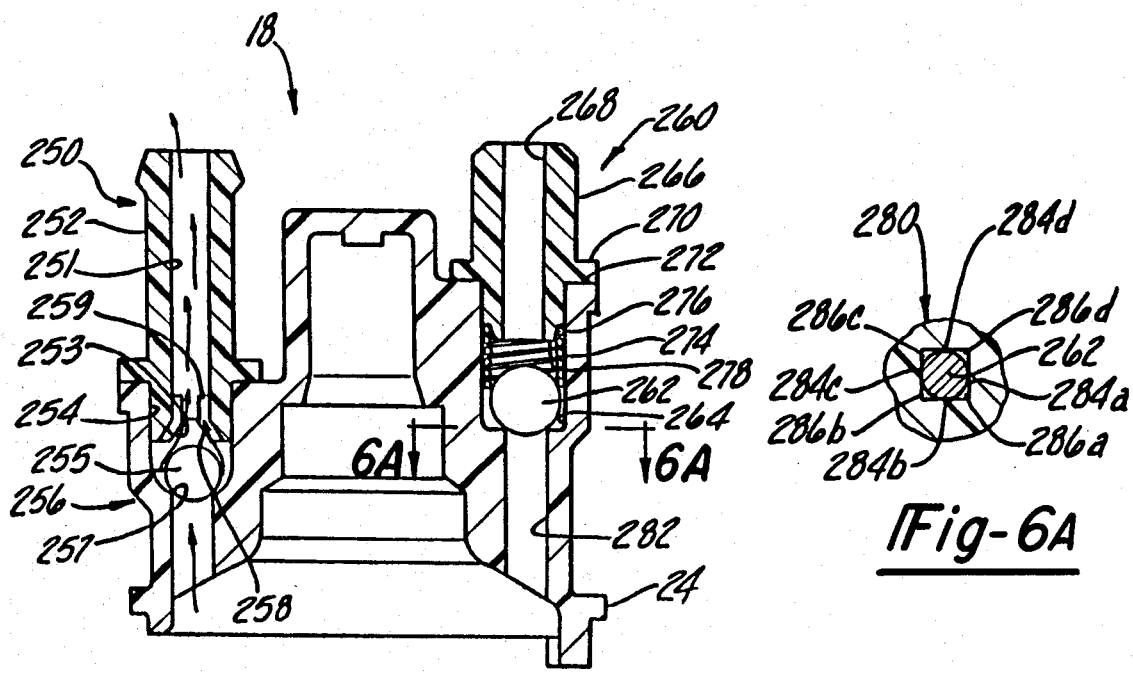
Fig-6
Fig-6A
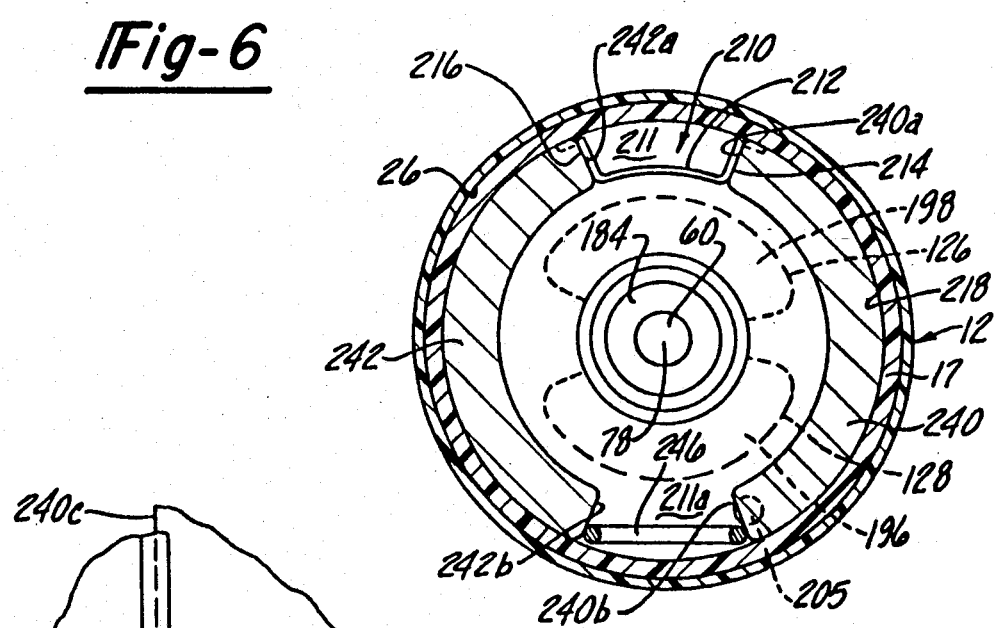
Fig-7
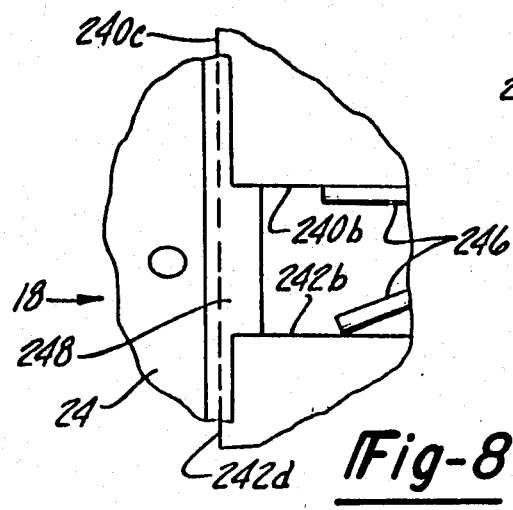
Fig-8

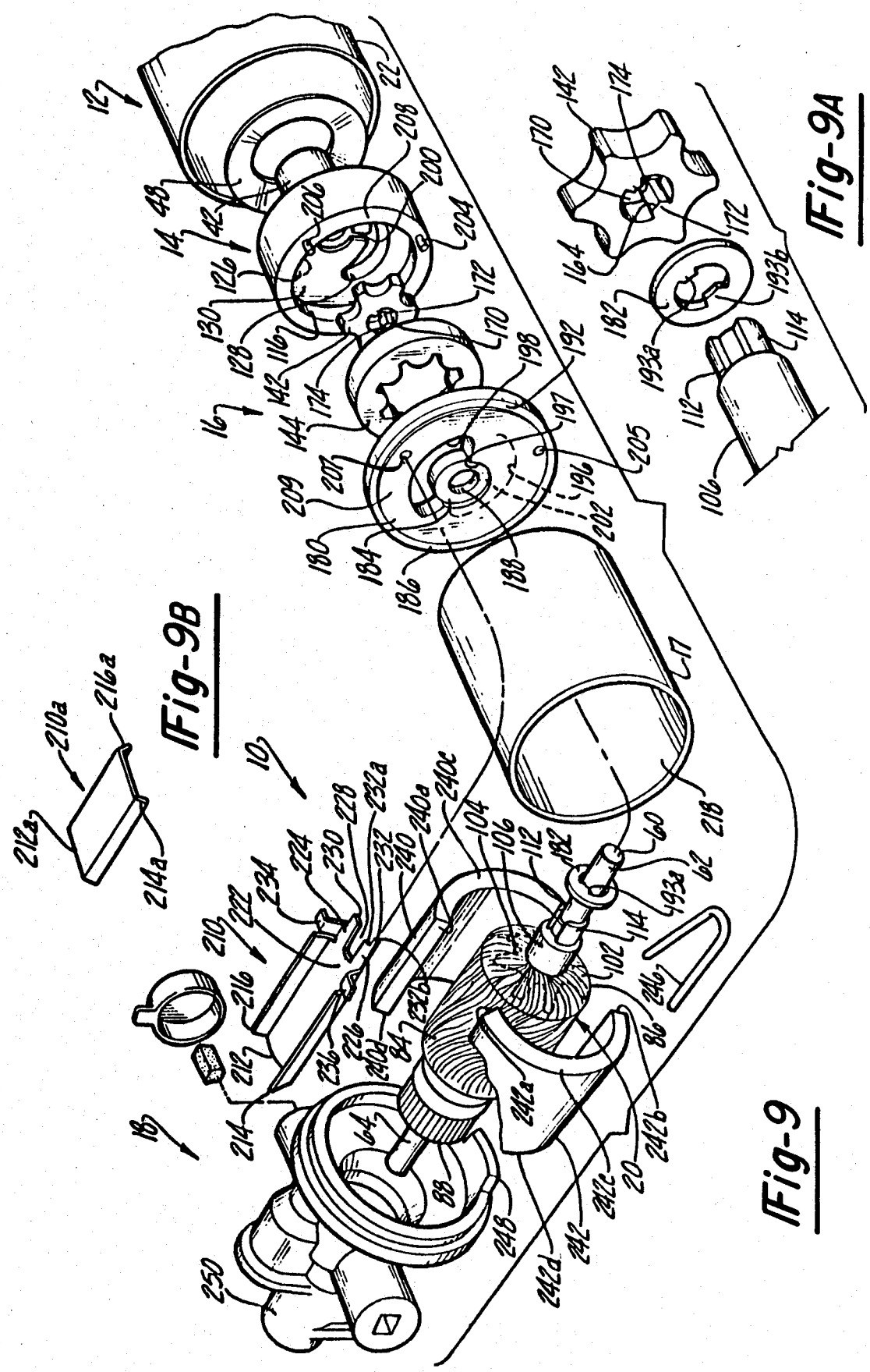

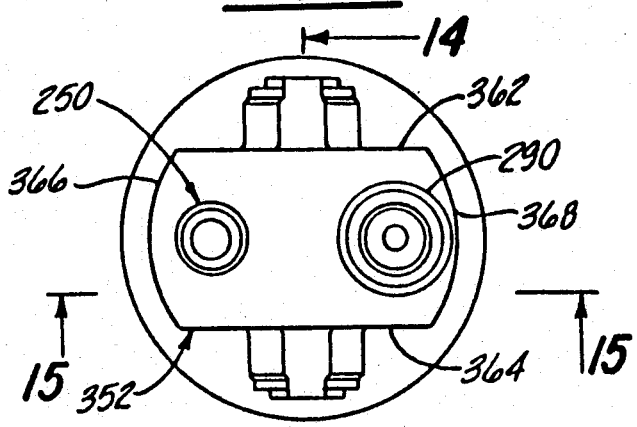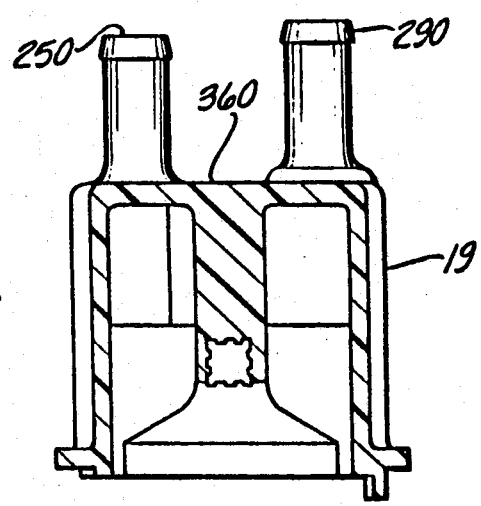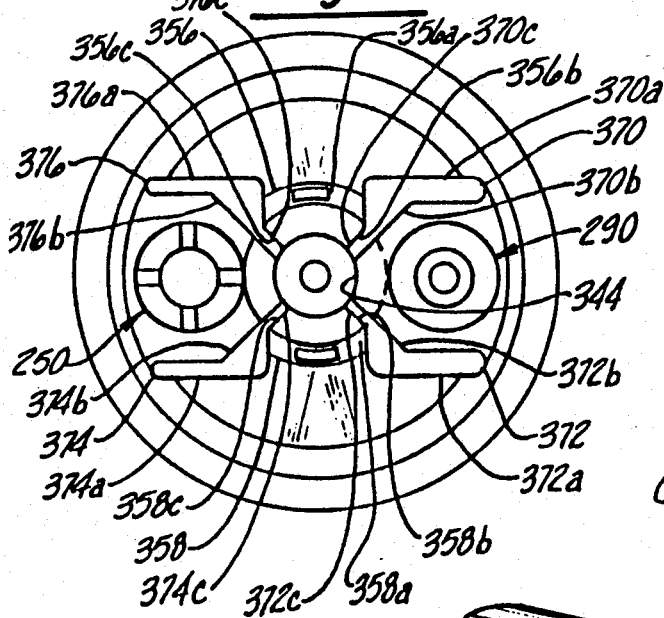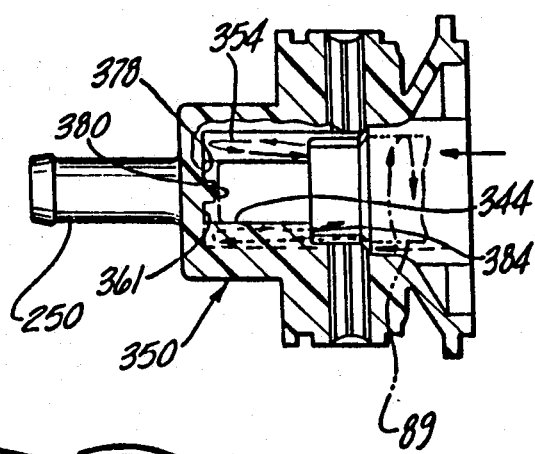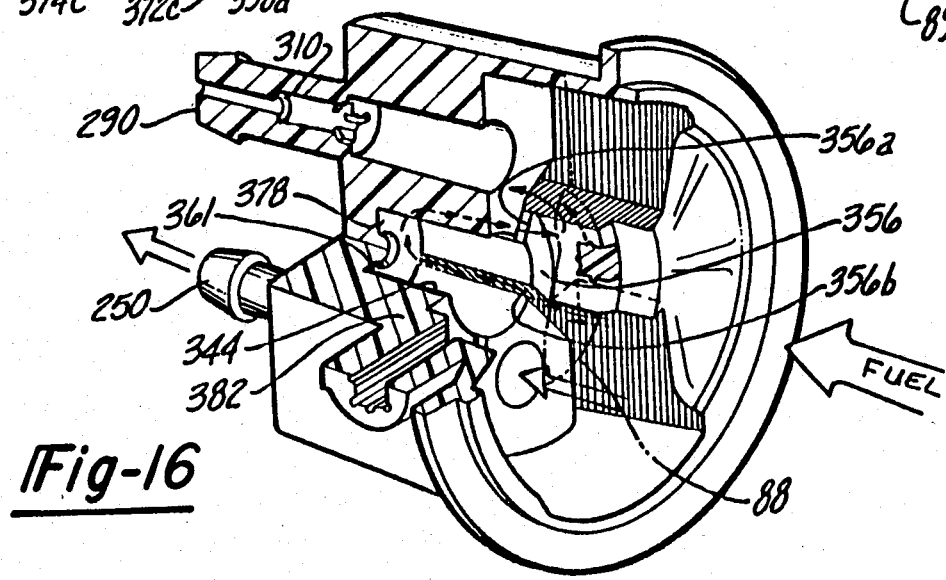

WET MOTOR GEROTER FUEL PUMP

CROSS REFERENCE TO RELATED CASES

This is a continuation of application Ser. No. 603,564, filed Apr. 25, 1984 now abandoned.

This application is to the following commonly-assigned applications filed concurrently herewith and the disclosures of which are hereby expressly incorporated herein by reference.

1. Ser. No. 603,599, filed Apr. 25, 1984, entitled "Wet Motor Gerotor Fuel Pump With Vapor Vent Valve And Improved Flow Through The Armature" by Harry W. Moore, III;
2. Ser. No. 603,611, filed Apr. 25, 1984, entitled "Wet Motor Gerotor Fuel Pump With Fuel Flow Through The Bearing For Cooling Thereof" by William A. Carleton, James R. Locker, Harry W. Moore III, and David L. Williams now U.S. Pat. No. 4,580,951;
3. Ser. No. 603,590, filed Apr. 25, 1984, entitled "Wet Motor Gerotor Fuel Pump With Self-Aligning Bearing" by William A. Carleton; and
4. Ser. No. 915,943, filed Oct. 3, 1986, which is a file wrapper continuation of Ser. No. 603,585, filed Apr. 25, 1984, now abandoned entitled "Vent-Relief Valve For A Wet Motor Gerotor Fuel Pump" by William A. Carleton and Harry W. Moore III.

BACKGROUND OF THE INVENTION

1. Field of the Invention

The present invention relates to fuel pumps and, more particularly, to fuel pumps wherein the armature of the driving motor is immersed in the fluid being pumped.

2. Description of the Prior Art

One of the elements heretofore limiting the life of a wet motor fuel pump has been durabilty of the slot and key coupling between the driving member of the motor and the driven member of the pump. Such wear is especially critical where the pump is a gerotor pump because the wear affects the clearance and also the wearing of the gear teeth effecting the puaping. Moreover, such slot and key couplings generate noise that increases with wear.

Another problem with wet motor pumps is that the rotating armature of the motor affects the flow of fuel thereby. The rotating armature creates turbulence in the fuel flow that reduces the flow rate and increases the armature current required for such reduced flow rate. Moreover, such turbulence undesirably increases the fuel temperature.

A further problem with fuel pumps of the gerotor type is that the tight tolerances on the gear members of the gerotor pump impose similarly tight tolerances on other members of the pump, such as the armature shaft and the bearings supporting it. To the extent that such tolerances are tighter than might otherwise be necessary, the overall cost of the pump is increased.

A further problem with gerotor pumps is that they are comparatively expensive to manufacture and assemble because of the greater number of higher precision parts. Moreover, other parts, such as the motor magnets, must be cemented into place in careful alignment with and clearance from the armature, interference between the armature and magnets being a known failure mode and interference between the pump end of the armature windings and the port plate of the pump being another.

SUMMARY OF THE INVENTION

The present invention recognizes that the wear characteristics of the coupling between the armature shaft and the driven member of the pump may be significantly improved while at the same time relaxing tolerances on other parts and enhancing their assembly and life by replacing the conventional slot and key arrangement with a face dog coupling not heretofore used in gerotor fuel pumps.

The present invention further recognizes that an axial flow channel may be created between the motor magnets to provide fuel flow therepast while at the same time enhancing the assembly of the magnets.

The present invention further recognizes that overall assembly and performance of the pump can be enhanced at a lower cost by a pump case designed to properly align the inlet housing with the pump members and the motor members while at the same time effecting the necessary seals without using seal devices such as O-rings.

In accordance with the present invention, a unitary tubular pump case encloses and aligns a one piece inlet and pump housing, a gerotor pump outlet plate, a motor flux ring, and a shoulder of an outlet housing, the pump case also has a tubular inlet adapted to be coupled with a source of fuel. The inlet and pump housing houses the inner and outer pump gears of a gerotor pump and cooperates with the outlet housing to rotatably support the end portions of an armature shaft of a wet motor armature so as to allow slight end-for-end self-alignment of the armature shaft relative to the inner pump gear which is still precisely aligned with the gerotor cavity and outer pump gear. The armature windings are looped about the fingers of a fiber hub secured to the armature shaft which has a pair of diametrically opposed drive dogs projecting axially into a coupling cavity provided in the inner gerotor pump gear. A pair of driven dogs on the inner pump gear project radially into the coupling cavity and are there drivingly mated with the driving dogs of the fiber hub.

A thrust washer mounted on the fiber hub against a thrust shoulder thereon also has a pair of driven dogs extending radially inwards to mate with and be driven by the drive dogs of the fiber hub. The thrust washer bears against a suitable thrust surface in a pump outlet plate functioning to enclose the inner and outer pump gears in a gerotor cavity provided in the inlet and pump housing. The pressurized fluid pumped through the pump outlet plate is channeled in a channel established between one set of circumferentially-juxtaposed axial surfaces of a pair of crescent-shaped motor magnets. Such axial surfaces are separated circumferentially by a keeper inserted therebetween having a central bridge portion abutting radially against the motor flux ring and bounded by a pair of leg portions opening radially inwards towards the armature to abut against the one set of axial surfaces of the crescent shaped motor magnets. A compression spring is inserted between the other set of circumferentially-juxtaposed axial surfaces of the motor magnets to urge the first set circumferentially against the legs of the keeper, such compression spring thereby establishing a second axial flow channel past the armature.

It is therefore a primary object of the present invention to provide a new and improved wet motor fuel pump.

It is a further primary object of the present invention to provide a fuel pump of the foregoing type wherein the driving member of the motor is coupled to the driven member of the pump by a face dog or tang coupling.

It is another object of the present invention to provide a fuel pump of the foregoing type wherein the durability of the pump is enhanced and the noise generated thereby is reduced compared to a conventional slot and key coupling.

It is another primary object of the present invention to use a face dog coupling to drive a driven gerotor gear while at the same time allowing a slight end-for-end self-alignment of the armature shaft relative to the bore of the driven gear.

It is a further object of the present invention to support the pump end of the armature shaft in a bushing resiliently supported by the inlet housing of the pump, such resilient support permitting a slight self-alignment of the armature shaft with respect to the gerotor elements.

It is another object of the present invention to enhance the thrust bearing between the motor and the pump outlet plate.

It is a further primary object of the present invention to provide a wet motor fuel pump wherein flow rates are increased at reduced armature currents and at the same time such flow is made smoother and cooler than for conventional wet motor fuel pumps of comparable size and capacity.

It is a further object of the present invention to provide a new and improved structure for flowing fuel past the rotating armature, such structure channelling the flow through an axial channel established between adjacent motor magnets and opening inwardly towards the rotating armature.

It is a further object of the present invention to provide the foregoing channel with a magnet spacer or keeper opening radially inwards toward the armature and functioning to circumferentially separate the juxtaposed axial surfaces of the motor magnets.

It is a further primary object of the present invention to provide a wet motor fuel pump having a pump case that aligns the major elements of the pump including the inlet and pump housing, the pump outlet plate, the motor flux ring, and also the outlet housing.

It is a further object of the present invention to provide a pump case of the foregoing type that also serves as the inlet coupling for the pump while also being sealed to the outlet housing by a lip of the pump case flanged inwardly over a shoulder of the outlet housing.

These and other features and objects of the present invention will become more apparent to those skilled in the art from the following description of a preferred embodiment thereof and the appended claims, all taken in conjunction with the appended drawings wherein:

BRIEF DESCRIPTION OF THE DRAWINGS

FIG. 6 is a cross-sectional view of the outlet housing with an outlet check valve and vent valve of the gerotor fuel pump of FIG. 1 taken along line 6—6 thereof;

FIG. 6A is a cross-sectional view of an imperfect valve seat and ball valve of the vent valve of FIG. 6 taken along line 6A—6A thereof;

FIG. 7 is a view of the gerotor fuel pump of FIG. 2 taken along line 7—7 thereof;

FIG. 8 is a fragmentary plan view of a portion of FIG. 2 showing the orientation of the outlet housing by the use of an indexing tab positioned between the two motor magnets;

FIG. 9 is an exploded view, in perspective, of the gerotor fuel pump shown in FIGS. 1 through 8;

FIG. 9A is a perspective view of the coupling arrangement of the armature shaft and the inner gerotor pump gear of FIGS. 1 through 9;

FIG. 9B is a perspective view of an alternative less preferable embodiment of the keeper of FIGS. 7 and 9;

FIG. 12 is a top view of the alternate outlet housing of FIG. 10;

FIG. 13 is a bottom view of the internal configuration of the alternate outlet housing of FIG. 12;

FIG. 14 is a cross-sectional view through just the alternate outlet housing of FIGS. 10, 12, and 13 taken along line 14—14 of FIG. 12;

FIG. 15 is a view taken through just the outlet housing of FIGS. 10, 12, 13, and 14 taken along line 15—15 of FIG. 12; and FIG. 16 is an exploded view in perspective of certain features of the alternate outlet housing assembly, certain parts thereof being broken away.

DETAILED DESCRIPTION OF THE PREFERRED EMBODIMENT

Figure 2:
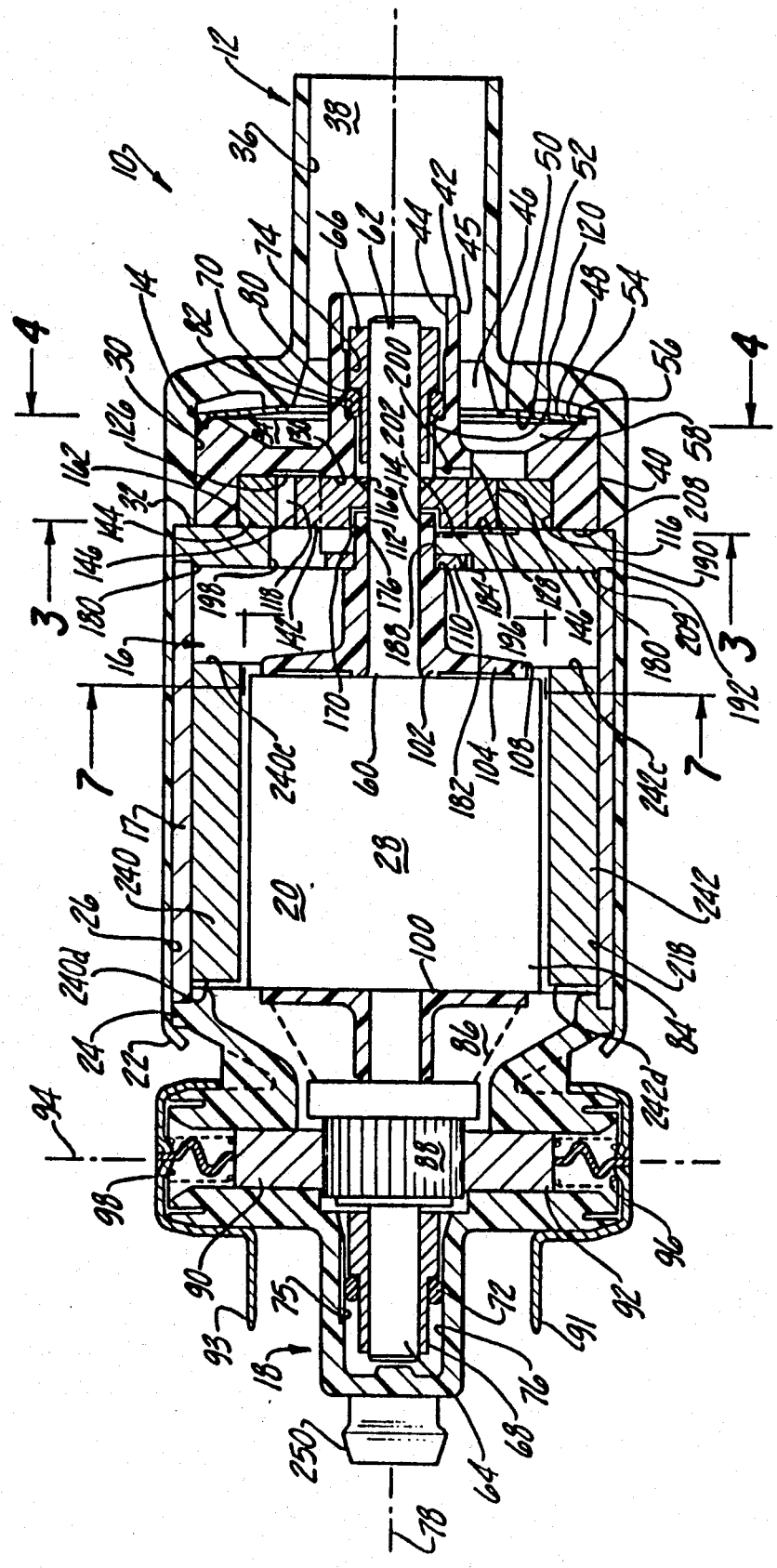
FIG. 2 is an axial cross-sectional view of the gerotor fuel pump of FIG. 1 taken along line 2—2 thereof.

With reference now primarily to FIGS. 2 and 9, there is shown a wet motor gerotor pump assembly or pump 10 for receiving a fluid, such as fuel from a source such as a fuel tank (not shown), and delivering pressurized fluid to a utilization device, such as an internal combustion engine (not shown). The wet motor gerotor pump assembly or pump 10 includes a tubular stepped case 12 generally enclosing an inlet and pump housing 14, a gerotor pump assembly 16, a motor flux ring 17, a pump outlet or port plate 180, and being sealed against an outlet housing 18 with an electric motor assembly 20 supported between the inlet and pump housing 14 and the outlet housing 18.

The tubular stepped case 12 terminates at one end in a sealing lip 22 flanged inwardly to seal against an outwardly extending annular shoulder 24 of the outlet housing 18. Towards its other end, the tubular stepped case 12 includes an outer bore 26 generally defining a motor chamber 28, a pump bore 30 optionally stepped inwardly from the outer bore 26 at an annular shoulder 32 and generally defining a pump chamber 34, and an inlet bore 36 stepped inwardly from both the outer and pump bores 26 and 30 and generally defining an inlet chamber 38. The inlet chamber 38 is adapted to be communicated in a known manner with a fuel source (not shown), such as by a known fluid coupling, conduit and filter (not shown).

Made of a one-piece diecast zinc structure, the inlet and pump housing 14 has a cylindrical outer periphery 40 fitted into the pump bore in the pump chamber 34 of the tubular stepped case 12. At an inlet end thereof, the inlet and pump housing 14 terminates in a tubular hub 42 protruding into the inlet bore 36 and inlet chamber 38 of the tubular stepped case 12 and also has a stepped bore 44 of a structure and function to be described in greater detail hereinafter. The cylindrical exterior 45 of the tubular hub 42 is separated by an annular space 46 from an encircling annular spring washer 48 having an inner diameter portion 50 seated against an annular hub seat 52 protruding axially inwardly from the interior of the tubular stepped case 12. The annular spring washer 48 also has an outer diameter portion 54 captured axially and radially in an annular counterbore 56 formed on the inlet side 58 of the inlet and pump housing 14 just inboard of the cylindrical outer periphery 40 thereof.

The electric motor assembly 20 includes an armature shaft 60 having an armature shaft inlet end 62 and an armature shaft outlet end 64, each shaft end being rotatably supported by a respective tubular bushing or bearing 66 and 68 slip-fitted thereon and resiliently supported by O-rings 70 and 72, respectively, engaging a bore 74 in the inlet and pump housing 14 and a bore 76 in the outlet housing 18. The tubular bushing 66 is lubricated and cooled by fuel in the inlet chamber 38, and the tubular bushing 68 is lubricated by fluid fed through axial slots 75 spaced about the periphery of the bore 76. The armature shaft 60 is positioned generally along a central flow axis 78 through the wet motor gerotor pump assembly 10 and is positioned therealong by a thrust washer 182 being positioned against a thrust washer surfce or seat 184 which is part of the pump outlet or port plate 180 by means of the magnetic attraction acting between the magnets 240 and 242 of the armature stack. The bearing 66 at the inlet is positioned by means of a shoulder 80 extending outwardly from the tubular bushing 66 and an annular shoulder 82 extending inwardly from the tubular hub 42 to thereby capture the O-ring 70 therebetween.

Adapted to rotate in the motor chamber 28, the electric motor assembly 20 includes an armature 84 made of a plurality of armature windings 86 wound through a plurality of slotted armature laminations (not shown) press-fitted on a knurled portion (not shown) of the armature shaft 60. Each armature winding 86 has respective first and second ends terminated in a known manner at a commutator 88 adapted to electrically and slidingly engage a pair of diametrically opposed commutator brushes 90 and 92 electrically coupled to respective cup-shaped terminals 91 and 93. The brushes 90 and 92 are urged against the commutator 88 along a brush displacement axis 94 by a respective first and second brush spring 96 and 98.

Press fitted on the knurled portion of the armature shaft 60 axially outboard the opposite ends of the armature laminations are a first and a second end fiber 100 and 102, each having eight fingers 104 extending radially outwards from a fibrous central tubular hub 106 spaced equiangularly thereabout, each finger 104 having at its tip an axially extending tab 108 extending axially inwards towards the armature laminations to provide a stand off therefrom. The outward axial side of each finger 104 has a smooth curved outer surface therealong so as to non-abrasively engage and support the end loops of the armature windings 86. The fibrous central tubular hub 106 of the end fiber 102 has an annular thrust shoulder 110 extending radially outwards therefrom and terminates axially in a pair of drive tangs or dogs 112 and 114, best seen in FIG. 9, in the form of diametricallyopposed arcuate sections extending axially towards and into the inlet and pump housing 14.

Figure 3:
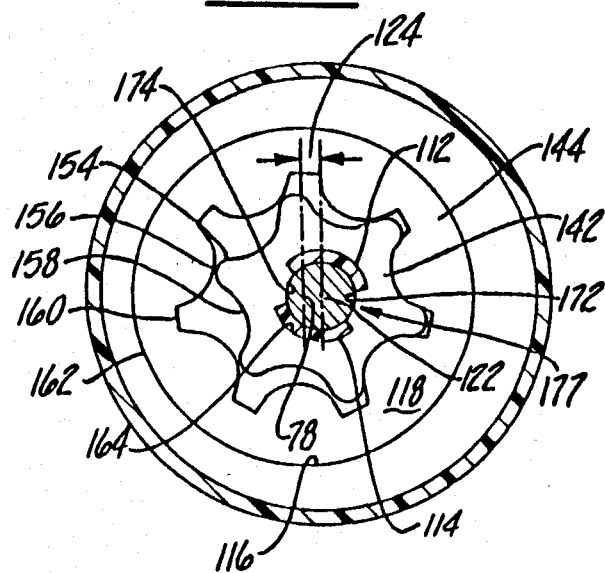
FIG. 3 is a transverse radial cross-sectional view of the gerotor fuel pump of FIG. 2 taken along line 3—3 thereof.
Figure 4:
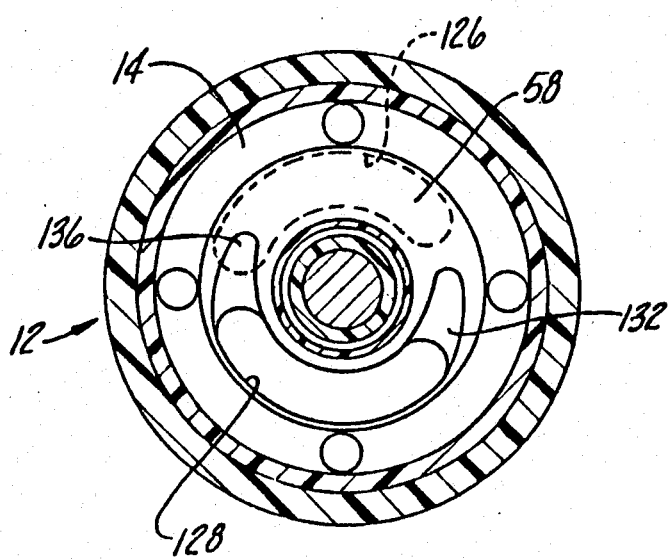
FIG. 4 is a transverse radial cross-sectional view of the gerotor fuel pump of FIG. 2 taken along line 4—4 thereof.

As may be better understood with reference to FIGS. 2, 3, and 9, the inlet and pump housing 14 has a counterbore 116 opening towards the armature 84 and defining a gerotor cavity 118 and also has a central bore 120 therethrough. The counterbore 116, the gerotor cavity 118, and the central bore 120 are concentric about an offset axis 122, best seen in FIGS. 3 and 9, having a predetermined radial offset 124 from the central flow axis 78 along a first radial direction generally perpendicular to the brush displacement axis 94. As may be better understood with reference to FIGS. 2, 4, and 9, an oblong depression 126 and an oblong aperture 128 are provided in a bottom surface 130 of the counterbore 116 and are disposed generally concentrically about the central bore 120. As best seen in FIG. 4, the inlet side 58 of the inlet and pump housing 14 has a first oblong inlet depression 132 extending axially therein. The first oblong inlet depression 132 on the inlet side 58 communicates with the oblong aperture 128 in the bottom surface 130 of the counterbore 116 and a second oblong inlet depression 136 on the inlet side 58 of the inlet and pump housing 14 which also communicates with the entire oblong aperture 128 in the bottom surface 130. The first and second inlet depressions 132 and 136 cooperate to provide unpressurized fluid to the gerotor cavity 118 for both priming the gerotor pump assembly 16 and providing fluid to be pressurized thereby.

Figure 5:
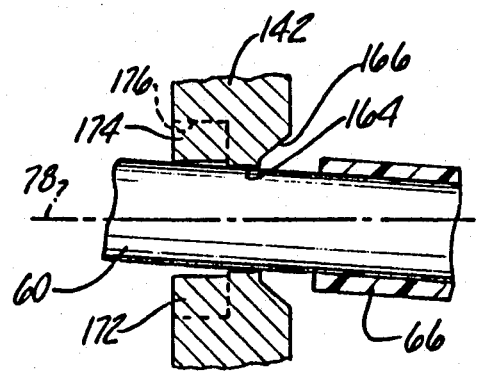
FIG. 5 is an enlarged and exaggerated view of portions of an armature shaft and inner gerotor pump gear.

Located in the gerotor cavity 118 of the gerotor pump assembly 16 are an inner pump gear 142 and an outer pump gear 144, shown only in FIG. 3. The inner and outer pump gears 142 and 144 have respective series of inner and outer pump teeth 154 and 156 and pump teeth spaces 158 and 160 intervening therebetween. The inner pump teeth 154 of the inner pump gear 142 are formed to pumpingly seal and engage the outer pump teeth 156 and teeth spaces of the outer pump gear 144, while the outer pump teeth 156 of the outer pump gear 144 are formed to pumpingly seal and engage the inner puap teeth 154 and the teeth spaces 158 of the inner pump gear 142. The outer pump gear 144 has a cylindrical external periphery 162 that is slipfittingly received by and positioned in the counterbore 116 of the gerotor cavity 118. The inner pump gear 142 has a central bore 164 therethrough which, as may be better understood with reference to FIGS. 2 and 5, has a tapered opening 166 facing the bottom surface 130 of the counterbore 116 of the inlet and pump housing 14. The internal diameter of the inner gear control bore 164 is slightly greater (e.g., 0.001 inches) than the external diameter of the armature shaft 60 passing therethrough and the axial length of the inner gear control bore 164 is selected to be comparatively short (e.g., 0.005 inches) with respect to the internal diameter thereof so as to allow the armature shaft 60 to pivot slightly end-to-end relative to the inner gear control bore 164 and thereby allow the O-ring 70 to self-align the armature shaft inlet end 62 in the bore 74 of the tubular hub 42. Such self-aligning allows the armature shaft 60 to effect small angles with respect to the central flow axis 78, such angles increasing with increasing manufacturing and assembling tolerances.

While thus allowed to self-align relative to the inner pump gear 142, the armature shaft 60, as better seen in FIGS. 3 and 9A, nevertheless drives the inner pump gear 142. The inner pump gear 142 has a pair of driven tangs or dogs 172 and 174 extending radially inwards therefrom into a drive coupling cavity 170. Forming a drive coupling 177, as best seen in FIG. 3, each of the drive tangs 11 and 114 have an included angle of approximately one hundred and eighteen degrees (118°), and each of the driven tangs 172 and 174 have an included angle of about fifty-eight degrees (58°). The four tangs 112, 114, 172 and 174 thereby have a total circumferential clearance of approximately eight degrees (8°). Such clearance allows sufficient circumferential play to permit easy assembly of the drive coupling but also slight axial misalignment thereof to allow the end-for-end self-alignment of the armature shaft 60 relative to the inner pump gear 142.

Completing the gerotor pump assembly 16 are the annular pump outlet or port plate 180 and the thrust washer 182 made of Teflon loaded Ultem. The pump outlet plate 180 has an annular thrust surface 184 counterbored into the outlet side 186 thereof and a bore 188 therethrough of a diameter sufficient to allow the drive tangs 112 and 114 of the fibrous central tubular hub 106 to freely pass therethrough with a suitable clearance (e.g., 0.005 inches). The annular pump outlet plate 180 also has a cylindrical outer periphery 190 and an annular radial groove 192 extending inboard therefrom, the outer peripheral surface 190 being received in the outer bore 26 of the tubular stepped case 12 and being seated against the face of the annular shoulder 32 therein, providing both radial and axial positioning relative to the motor flux ring 17. The thrust washer 182 is pressed against the annular thrust surface 184 of the pump outlet plate 180 by the annular thrust shoulder 110 of the fibrous central tubular hub 106. The thrust washer 182 has a pair of diametrically-opposed arcuate tangs or dogs 193a and 193b extending radially inward to engage and be driven by the dogs 112 and 114 of the fibrous central tubular hub 106.

On an axial side facing the inner and outer pump gears 142 and 144, the annular pump outlet plate 180 also has an oblong depression 196 and an outlet aperture 198 generally matching the shape and position of the oblong depression 126 and the oblong aperture 128 in the bottom surface 130 of the counterbore 116 of the gerotor cavity 118 of the inlet an pump housing 14. To afford proper pump priming and other desirable pumping characteristics, the oblong aperture 128 and the oblong depression 196 are communicated through, respectively, the bores 120 and 188 by appropriate radial slots 200 and 202, as best seen in FIGS. 2 and 9. Moreover, to provide a suitable outlet port for fluid pumped to a fluid pressure in the gerotor cavity 118, the annular pump outlet plate 180 has the oblong outlet aperture 198 formed therethrough and positioned and shaped to correspond with the oblong depression 126. To properly position the pump outlet plate 180 circumferentially with respect to the inlet and pump housing 14, a pair of locator pins 204 and 206 are affixed thereto to extend axially from an annular radial surface 208 to engage suitable holes 205 and 207 through an annular radial surface 209 of the pump outlet plate.

Pressure fluid from the oblong outlet aperture 198 of the pump outlet plate 180 is guided therefrom and protected from the windage effects of the armature 84 by a tunnel and magnet keeper device 210, best seen in FIGS. 7 and 9. The tunnel and magnet keeper device 210 consists of a first flow channel or passage 211 shielded from the armature windage extending substantially the entire axial length of the motor chamber 28 between the pump outlet plate 180 and the annular shoulder 24 of the outlet housing 18. Shaped generally in the form of an inverted staple, the tunnel and magnet keeper device 210 has a central bridge portion 212 bounded by a pair of leg portions 214 and 216. The central bridge portion 212 has a slightly convex shape, as seen from a point external to the pump, to match the circular contour of the periphery of the armature 84, and the pair of leg portions 214 and 216 extend radially outwards from the central bridge portion 212 to seat on an inner peripheral surface 218 of the cylindrical magnetic motor flux ring 17. The flux ring 17 also extends substantially the entire axial length between the pump outlet plate 180 and the outwardly extending annular shoulder 24 of the outlet housing 18.

To allow substantially unimpeded flow of pressure fluid from the oblong outlet aperture 198 into the tunnel and magnet keeper device 210 while also imparting a desired circumferential position to this device, the inlet end 222 thereof is provided with two axially extending protrusions 224 and 226 spaced radially apart to provide a fluid entrance 228 therebetween. The axial protrusion 224 terminates in a butt end 230 abutting directly against the annular radial surface 209 of the pump outlet plate 180. The axial protrusion 226 terminates in a stepped tab 232 having a butt end 232a abutting against the annular radial surface 209 and a pin portion 232b extending into the outlet side of the hole 207 provided to properly orient the pump outlet plate 180 with the inlet and pump housing 14 as aforementioned.

The leg portions 214 and 216 of the tunnel and magnet keeper device 210 cooperate with a pair of tabs 234 and 236 extending circumferentially outwards from the respective axial protrusions 224 and 226 to properly position the pair of crescent shaped motor magnets 240 and 242 both circumferentially and axially with respect to the armature 84. As may be better understood with reference to FIGS. 7, 8 and 9, each crescent shaped motor magnet 240 and 242 is bounded along its axial length by a first and a second set of juxtaposed axial surfaces 240a, 240b, 242a and 242b, and each motor magnet 240 and 242 is bounded at its inlet and outlet ends by respective end surfaces 240c, 242c, 240d and 242d.

In assembly, the tunnel and magnet keeper device 210 is first inserted so that the pin portion 232b thereof is positioned in the locator hole 207 of the pump outlet plate 180. Thereafter, the crescent shaped motor magnets 240 and 242 are inserted so that the axial surfaces 240a and 242a respectively abut the leg portions 214 and 216 and the end surfaces 240c and 242c abut the tabs 234 and 236. To properly space the motor magnets 240 and 242 from the outlet port plate 180 and provide a second axial channel 211a therebetween, a V-shaped compression spring 246 is then inserted between the second set of juxtaposed axial surfaces 240b and 242b to urge the axial surfaces 240a and 242a circumferentially into abutting contact with the leg portions 214 and 216 of the tunnel and magnet keeper device 210.

Finally, the outlet housing 18 is inserted into the tubular stepped case 12. The circumferential orientation of the outlet housing 18 is determined relative to the tunnel and magnet keeper device 210, as best seen in FIG. 8, by an arcuate tab 248 extending between the axial surfaces 240b and 242b of the crescent shaped motor magnets 240 and 242. A pump outlet port or fitting 252, through the outlet housing 18, is thereby aligned along the same axial plane intersecting the center of the tunnel and magnet keeper device 210 and the center of the outlet aperture 198 through the pump outlet plate 180.

The foregoing proper circumferential orientation of the outlet housing 18 relative to the tunnel and magnet keeper device 210 permits a flow of pressurized fluid smoothly therethrough directly from the outlet aperture 198, through the first flow passage 211, to the pump outlet port 252 of the outlet housing 18.

It has been found through experimental test results, under standard conditions, that the foregoing apparatus substantially improves pump performance. Compared with wet pumps of similar size and capacity, the foregoing wet motor pump assembly provided the desired fluid pressure at substantially increased flow rates with substantially decreased armature currents. For example, in one typical application to a conventional passenger car internal combustion engine, flow rates were uniformly increased by at least three gallons per hour while the corresponding armature currents were decreased at least twelve percent (12%).

Some portion of this improvement is attributed to merely providing the axial flow channel, such as the magnet keeper 210a of the type shown in FIG. 9B. Such a keeper has a central bridge portion 212a abutting radially outwards against the flux ring 17 and bounded by a pair of leg portions 214a and 216a opening radially inwards towards the armature 84. However, such a keeper would allow the armature windage to induce radially oriented hydraulic curls in the flow channels 211. But such turbulence would reduce the effective cross-sectional area of the axial flow channel 211 to a small portion of the actual cross-sectioned area thereof. To avoid such curls and turbulence and substantially increase the effective area, the tunnel and magnet keeper device 210 of the preferred embodiment is provided so that the central bridge portion 212 thereof shields the flow therethrough from the armature windage. Should further improvements be desired to avoid hydraulic curls induced with an orientation in the channel 211 by the flow restriction imposed by the circumferential width thereof, the channel 211 could be further subdivided into subchannels of a plurality of tubes or slots. Such subchannels would provide a laminar flow substantially increasing the effective cross-sectional area of the flow to the actual cross-sectional area of the channel.

Figure 1:
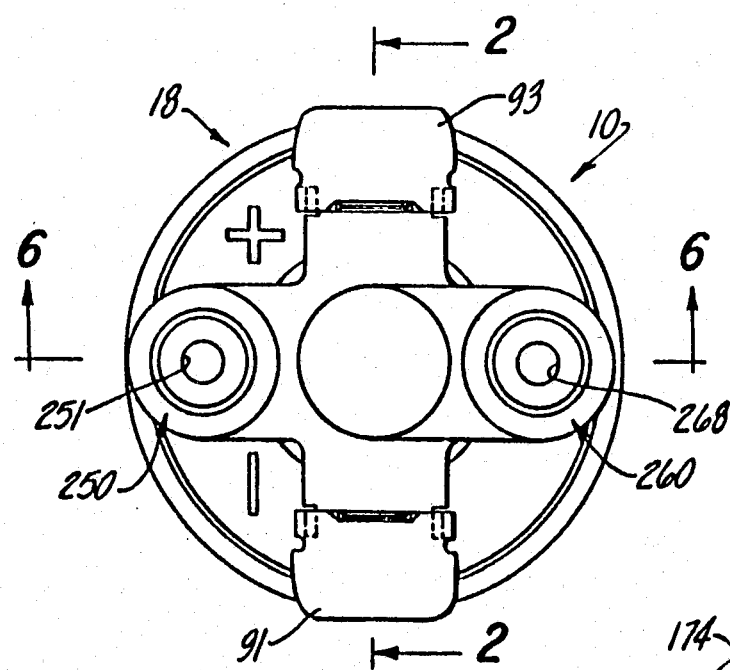
FIG. 1 is an end view of one embodiment of a wet motor gerotor fuel pump having certain features provided in accordance with the present invention.

As best seen in FIGS. 1 and 6, the outlet housing 18 made of a molded plastic such as Ultem, includes the pump outlet valve 250 with the tubular outlet port of fitting 252 adapted to be coupled to an internal combustion engine. The tubular outlet fitting 252 has an internal outlet passage 251 with a slotted seal 253 fitted into an outlet bore 254 to enclose a ball valve 255 of a one-way check valve 256 therein. The outlet housing 18 provides an annular seat 257 cooperating with the ball valve 255 to provide the one-way check valve 256 which serves to prevent backflow from the engine into the pump. To allow normal flow from the pump 10 to the engine, the tubular outlet fitting 252 terminates in four tapered prongs 258 forming slots 259 therebetween, the tapered prongs 258 normally restraining the outward movement of the ball valve 255 and the slots 259 allowing the fuel to flow out therebetween. The angle formed by the tapered prongs 258 is such as to cradle the ball valve 255 so as to prevent oscillation of the ball at certain flow rates.

A further feature of the wet motor pump assembly is a vapor vent valve 260 provided in the outlet housing 18, as best seen in FIGS. 6 and 6A. The vapor vent valve 260 is located diametrically opposite the outlet valve 250, and includes a ball 262 enclosed in a valve bore 264 by a tubular vent fitting 266 having a vent passage 268 therethrough and having an annular hub 270 seated against an annular seating surface 272 of the outlet housing 18. A helical spring 274 biases the ball 262 away from a shoulder 276 encircling an annular internal hub 278 of the tubular vent fitting 266 and towards an imperfect seal in the form of a square seat 280, best seen in FIG. 6A, at the end of a vent bore 282 formed in the outlet housing 18. When in contact with the square seat 280, the ball 262 touches the square seat 280 at only four points 284a, 284b, 284c, and 284d, such arrangement providing four suitable by pass passages 286a, 286b, 286c, and 286d. With this arrangement, a vapor pressure developed by the gerotor pump assembly 16, especially during self-priming thereof, is unload through the bypass passages 286a, 286b, 286c, and 286d until liquid reaches the output side of the pumping elements and the vent bore 282. Thereafter, the fluid pressure on the ball 262 will overcome the bias thereon by the helical spring 274 to seat the ball 262 on the annular internal hub 278 formed at the inboard end of the tubular vent fitting 266, thereby closing the vent passage 268 and allowing normal pumping operation and outlet through the outlet port 252.

The square seat 280 in the foregoing vapor vent valve 260 may be replaced by other suitable non-circular or imperfect, valve seats including, for example, partially-circular valve seats as might be effected by a circular valve seat having axially extending slots therethrough.

Figure 10A:
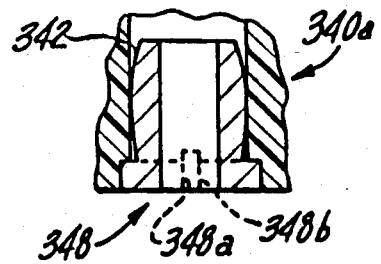
FIG. 10A is a perspective view of portions of an alternate version of the support bushing and outlet housing of FIG. 10 showing the slot and key arrangement thereof for limiting circumferential rotation of the bushing.
Figure 10:
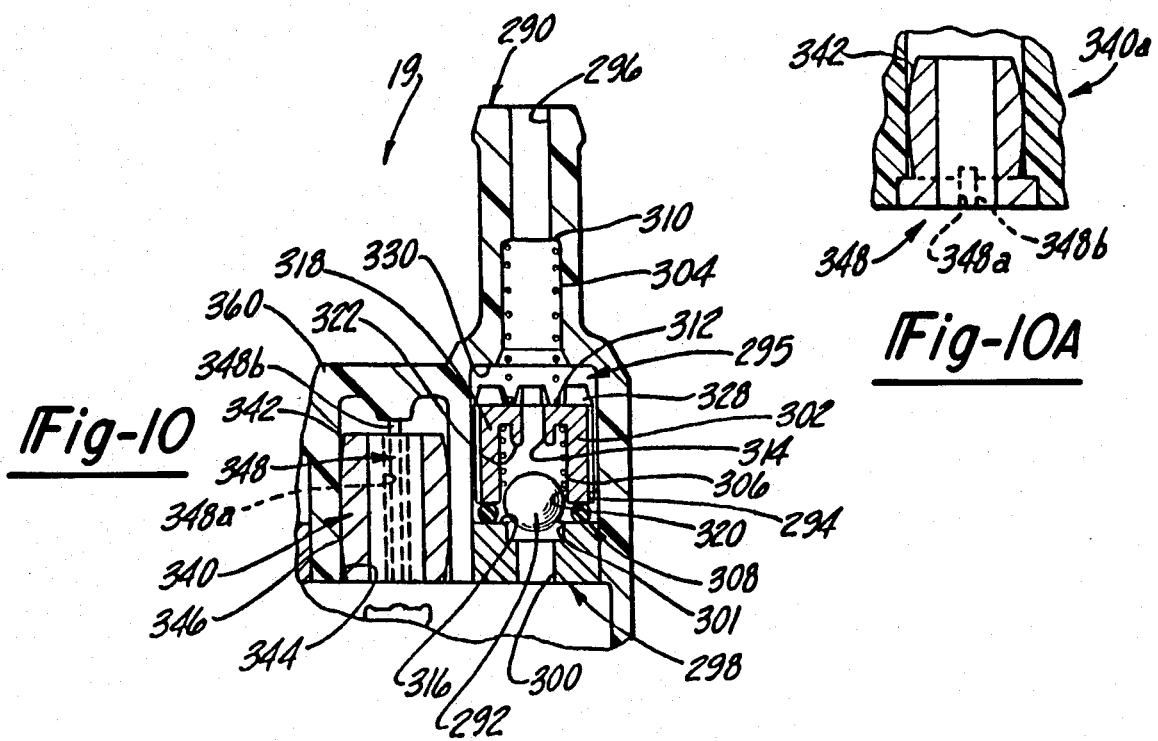
FIG. 10 is a partial sectional view of a portion of an alternative outlet housing, showing a vent-relief valve and a bushing for rotatably supporting an end portion of the armature shaft.
Figure 11:
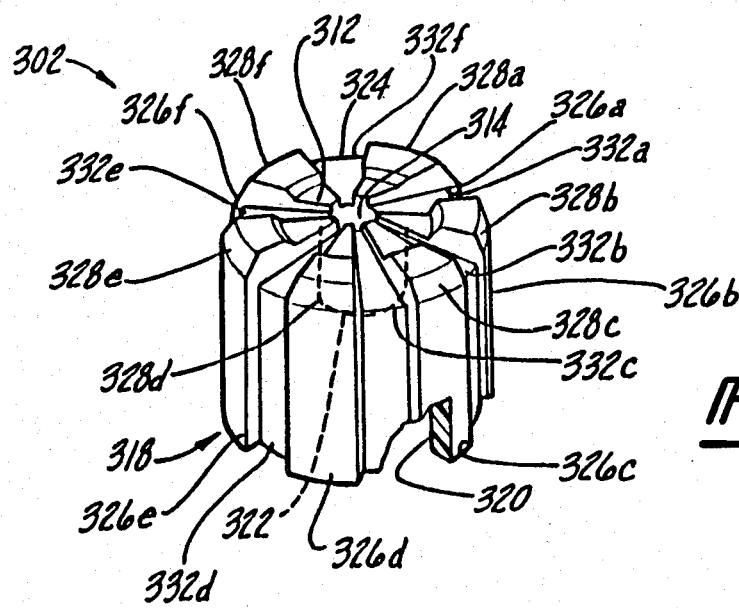
FIG. 11 is a perspective view of a pop-off valve of the ventrelief valve shown in FIG. 10.

A further application of an imperfect valve seat is in combination with a vent-relief valve 290 shown molded into the alternate outlet housing 19 in FIGS. 10 and 15. As may be better understood with reference thereto, a ball 292 is enclosed in a bore 294 provided in the outlet housing 19, the bore 294 defining therein a valve chamber 295. One end of the bore 294 is in constant communication with a vent-relief passage 296 provided through the end of the outlet housing 19, and the other end of the bore 294 is suitably secured, such as by ultrasonic welds, to a valve seat member 298 having a central passage 300 therethrough in constant communication with the motor chamber 28. The central passage 300 opens into an oblong valve seat 301 in the form of an oblong counterbore having a width equal to the diameter of the central passage 300 and a length twice thereof. When in contact with the vlave seat member 298, the ball 292 can contact the oblong valve seat 301 either at two diametrically opposite points if centrally located thereon, or in a semi-circle line contact if shifted to either extreme side thereof. Either way, there is a bypass passage constantly open between the ball 292 and the oblong valve seat 301.

Also located in the valve chamber 295 formed by the bore 294 and the valve seat member 298 is a tubular pop-off or relief valve 302, a first helical spring 304, a second helical spring 306, and an O-ring 308. One end of the first helical spring 304 is biased against an annular shoulder 310 formed in the vent-relief passage 296, and the other end of the first helical spring 304 is biased against an annular top surface 312 formed at the top of the pop-off valve 302 and encircling a central vent passage 314 therethrough. The first helical spring 304 biases the tubular pop-off valve 302 to normally seat and seal against the O-ring 308; the O-ring 308 being normally seated on an annular seat surface 316 provided on the valve seat member 298 about the oblong valve seat 301 thereof. When the pop-off valve 302 is thus normally urged against the O-ring 308 to seal against the annular seat surface 316, a normally-open bypass passage is established from the central passage 300 of the valve seat member 298, through the central vent passage 314 of the pop-off valve 302, and the vent-relief passage 296 of the outlet housing 19. This vent bypass passage is closed, as will be described, when the pump assembly 10 produces a fluid pressure in excess of a predetermined maximum venting pressure in the form of a liquid at the ball 292.

The tubular pop-off valve 302 also has an externally slotted tubular portion 318 having a tube bore 320, at one end clearing the outer diameter of the ball 292 and having an annular hub seat 322 depending internally from the other end. One end of the second helical spring 306 is seated about the annular hub seat 322, and the other end engages a peripheral surface of the ball 292 to normally urge the ball 292 to seat on the oblong valve seat 301. However, when the fluid pressure experienced by the pump 10 exceeds the maximum venting pressure, such excess pressure overcomes the bias of the second helical spring 306 on the ball 292 and moves the ball 292 towards the annular hub seat 322, seating on the same when the pump pressure exceeds the predetermined maximum venting pressure. At pump pressures between the maximum venting pressure and a predetermined relief pressure, the ball 292 closes the fluid passage between the central passage 300 and the vent-relief passage 296.

To provide a relief capability or condition when the pump experiences a fluid pressure in excess of the predetermined relief pressure, the axial periphery 324 of the pop-off valve 302 is provided with six ribs 326a, 326b, 326c, 326d, 326e, and 326f, extending radially outwards and spaced equiangularly thereabout on the slotted tubular 318, the ribs 326a through 326f also guiding and centrally positioning the pop-off valve 302 with respect to the bore 294. Each of the axial ribs 326a through 326f is contiguous with a respective spacer tab 328a through 328f upstanding axially from and about the annular top surface 312 and the central vent passage 314 therethrough. The tabs 328a through 328f are adapted to abut against and space the remainder of the pop-off valve 302 axially from an annular stop surface 330 counterbored in the outlet housing 19 about the vent-relief passage 296. The ribs 326a through 326f and the respective tabs 328a through 328f form passages or slots 332a through 332f therebetween spaced equiangularly about the axial periphery 324 of the pop-off valve 302. The slots 332a through 332f cooperate with the vent-relief passage 296 to continually communicate the entire space between the bore 294 and the axial periphery 324 of the pop-off valve 302 with the vent-relief passage 296. However, this space is not communicated with the central passage 300 until the pump experiences a fluid pressure in excess of the relief pressure, such excess pressure then overcoming the seating bias of the first helical spring 304 against the O-ring 308 to thereby move the pop-off valve 302 away from the annular seat surface 316 and towards the annular stop surface 330. Such excess pump pressure thereby urges the pop-off valve away from the O-ring 308 to unseat from the annular seat surface 316 thereby opening a passage from the central passage 300, between the bore 294, the axial periphery 324 of the pop-off valve 302, through the slots 332a through 332f, and out through the vent-relief passage 296.

Further alternate features of the pump 10, as shown in FIGS. 10 and 10A are alternate tubular bushings 340 and 340a, the axial length of which has a convex form or raised portion in the shape of an outwardly extending bowl or crown 342 that contacts a bore 344 in the outlet housing 18 to allow a slight end-for-end self-alignment of the armature shaft 60. To restrain the tubular bushing from rotating in the bore 344, an antirotation device is provided in the form of a slot and key arrangement 348 wherein a slot 348a in the tubular bushing 340 is circumferentially somewhat wider and radially somewhat deeper than a key 348b.

A further feature of the wet motor gerotor pump 10 is the utilization of otherwise existing structure in the alternate outlet housing 19 in combination with additional passages formed therein to cool and lubricate a portion of the tubular bushing 340 between the point of contact of a raised portion 346 with the bore 344 and a roof 360 of the outlet housing. As may be better understood with reference to the outlet housing 19 shown in FIGS. 10 through 16, a bearing lubrication and cooling system 350 in the form of a flow network 354 is provided between a raised cap portion 352, a cylindrical peripheral surface 89 of the commutator 88, the bore 344, and a pair of brush support ridges 356 and 358 for supporting the brushes 90 and 92, respectively.

As best seen in FIG. 12, the raised cap portion 352 outlet valve 250 and the vent-relief valve 290 hose fitting, and includes the generally flat roof 360 supporting the outlet valve 250 and the vent-relief valve 290, and further includes a pair of side walls 362 and 364, and a pair of curved end walls 366 and 368.

The flow network 354, when viewed in the transverse radial plane of FIG. 13, is shaped generally in the form of the Roman numeral X. More particularly, the flow network 354 includes four branches 370, 372, 374, and 376, each in the shape of a dog leg and each communicating with the axial length of the bore 344 as well as an annular recess 378 encircling a stop hub 380 projecting into the bore 344 from the roof 360. Each of the branches 370 through 376 extends axially along the bore 344 to the inner surface 361 of the roof 360. Each includes a side wall branch portion 370a, 372a, 374a, and 376a. Each such side wall branch portion is generally parallel to one of the side walls 362 and 364, with the side wall branch portions 370a and 372a generally spanning the vent-relief valve 290 while the side wall branch portions 374a and 376a generally span the outlet port 252. Each of the branches 370, 372, 374, and 376 also include a radial branch portion 370b, 372b, 374b and 376b, each terminating in a respective side wall branch portion with a respective radial slot 370c, 372c, 374c, and 376c formed circumferentially through a bore wall 382 providing the bore 344.

The brush support ridges 356 and 358 include an arcuate ridge crown or wall element 356a and 358a facing radially inward, the arcuate ridge crown 356a being bounded by a pair of radial ridge side walls 356b and 356c while the arcuate ridge crown wall 358a is bounded by a pair of radial ridge side walls 358b and 358c. Each set of the radial ridge side walls 356b, 356c, 358b, and 358c are spaced radially apart by an included angle of about ninety degrees (90°) and, together with their respective arcuate ridge crown walls 356a and 358a, extend axially to an arcuate ridge wall counterbore 384 at a depth corresponding with the axial width of the commutator 88. The arcuate ridge crowns or walls 356a and 358a are of a diameter slightly greater than that of the commutator 88 to allow clearance therebetween for appropriate brush commutator interaction. The bore 344 commences at the depth of the arcuate ridge counterbore 384 and extends axially to the inner side 361 of the roof 360. With the bore 344 starting below the brush support ridges 356 and 358, there is an arcuate opening of approximately ninety degrees (90°) between the radial ridge side walls of the opposing brush support ridges 356 and 358. In other words, there is a circumferential gap of about ninety degrees (90°) extending the axial length of the commutator 88 between the radial ridge side walls 356b and 358b, and a similar gap extends circumferentially between the radial ridge side walls 356c and 358c.

Assuming that the armature 84 is energized to rotate in a counterclockwise direction as viewed in FIG. 13, the cylindrical periphery surface 89 of the commutator 88 viscously drags fluid therewith, such fluid being picked up by the rotation of the commutator at the radical slots 376c and 372c having, respectively, the radial ridge side walls 356c and 358b and being delivered or thrown off against the next radial ridge side walls 358c and 356c, respectively, of the radial slots 374c and 370c. The fluid picked up at the diametrically opposite radial ridge side walls 356c and 358b, therefore experiences a higher velocity than the fluid impacting and collecting at the diametrically radical opposite ridge side walls 356b and 358c. This difference in velocities causes the fluid in the radial slots 370c and 374c to move slower and, therefore be at a pressure higher than the fluid at the radial slots 372c and 376c. A similar pressure differential could be effected by other structures, such as a vane or other form of flow resistance, the ridge walls in the present embodiment serving a dual function of supporting the brushes while also providing the necessary pressure differential.

In any event, the resulting pressure differential created by the drag forces of the commutator cylindrical peripheral surface 89 on the fluid at the indicated radial ridge side walls effects a pumping action of fluid in the radial branch portions 370b and 374b. Such pumping action is axially outwards towards the inner surface 361 of the roof, then radially inwards into the annular recess 378, then axially about the tubular bushing 340, then radially outwards from the annular recess 378, and finally back through the opposing radial branch portions 372b and 376b. In other words, the commutator cylindrical peripheral surface 89, the brush support ridges 356 and 358, and the flow network 354 establish two parallel pumping chambers or circuits separated by the commutator 88 but joined at the annular recess 378. The pressure differentials created by the difference in velocities at the indicated radial ridge side walls provides two incoming and two outgoing flows of fluid thereat, both flows combining to cool and lubricate the tubular bushing 340 and the bore 344. With such cooling and lubrication, the life of the upper tubular bushing 340 has been found to be significantly increased over the life of the same bearing without such lubrication and cooling. Moreover, an acceptable lubrication will also occur by providing just a single circuit communicating with the annular recess 378 communicating with the upper end upper portion of the tubular bushing 340 above the point its crown 342 contacts the bore 344. Such lubrication would be less than that provided by the dual parallel circuit shown. Also, a slight flow of fluid might be provided by such a single circuit should the internal structure by happenstance provide a sufficient pressure differential between the inlet and the outlet to the annular recess 378, without the benefit of additional pressure building structures.

Although the best mode contemplated by the inventor for carrying out the present invention as of the filing date hereof has been shown as described herein, it will be apparent to those skilled in the art that suitable modifications, variations, and equivalents may be made without departing from the scope of the invention. This invention is to be limited solely by the terms of the claims appended hereto.

What is claimed is:

1. A wet motor gerotor fuel pump for pumping fuel from a fuel source to an internal combustion comprising:

a pump case having one end, an opposite end and a flow axis therethrough, said pump case further comprising an inlet end bore at said one end adapted to communicate with said fuel source;

a narrow conduit inlet chamber adjacent said inlet end bore;

a motor chamber located in said opposite end of said pump case;

a pump chamber having a body portion substantially larger than said narrow conduit inlet chamber interposed said motor chamber and said narrow inlet chamber;

first means for sealing said pump case, said first means for sealing located at said opposite end of said pump case;

inlet housing means mounted in said pump chamber, said inlet housing means comprising an annular hub protruding into said narrow conduit inlet chamber, said annular hub and said narrow conduit inlet chamber defining a flow channel therebetween, said inlet housing means further comprising a gerotor cavity about a gerotor axis located parallel to and displaced a predetermined distance in an eccentric radial direction from said flow axis;

outlet housing means having pump outlet means adapted to be communicated with said internal combustion engine and further comprising a second means for sealing coupled to said first means for sealing;

electric motor means comprising armature means having an armature shaft with a first and a second end rotatably supported, respectively, at said inlet housing means and said outlet housing means, said armature means further having drive hub means mounted to said armature shaft, said drive hub means having first tang means extending in a first radial direction relative to said armature shaft; and gerotor pump means located in said gerotor cavity, said gerotor pump means comprising an inner pump gear, an outer pump gear, and second tang means located on one of said inner and outer pump gears, said second tang means further extending in a second radial direction radially offset from said first radial direction and forming a driving connection with said first tang means such that said fuel pump pumps fuel from said fuel source into said narrow conduit inlet chamber, through said gerotor pump means past said electric motor means into said outlet housing means substantially along said flow axis to said internal combustion engine, said driving connection between said second tang means and said first tang means allowing for end-to-end self-alignment between said armature shaft and said one of said inner pump gear and said outer pump gear.

2. The wet motor gerotor fuel pump of claim 1 wherein said one of said inner and outer pump gears has a coupling cavity and said second tang-means extend radially into said coupling cavity and wherein said drive hub means extends axially into said coupling cavity so that said first tang means engages said second tang means.

3. The wet motor gerotor fuel pump of claim 1, further comprising a first and a second bearing means for rotatably supporting said first and second ends of said armature shaft respectively in said inlet housing means and said outlet housing means, each of said first and second bearing means comprising a resilient mounting means to allow said armature shaft to have an axial alignment offset from said flow axis.

4. The wet motor gerotor fuel pump of claim 3, wherein said first end of said armature shaft has an outer shaft diameter and protrudes through a bore in said inner pump gear, said bore of said inner pump gear having a bore diameter and a predetermined bore length to allow said armature shaft to pivot within a predetermined angular range with respect to said flow axis, whereby said resilient mounting means and said predetermined angular range cooperate to allow self-alignment of said armature shaft with respect to said flow axis.

5. The wet motor gerotor fuel pump of claim 1, wherein said electric motor means further comprises:
first and second magnet means, each of said first and second magnet means further comprising an inner and an outer axial surface extending in a direction along said flow axis about said armature means, a first and a second side surface extending in a direction along said flow axis, and a first and a second end surface; and
magnet spacing means positioned between said first and second magnet means for spacing said first and second side surfaces of said first magnet means circumferentially with respect to said first and second side surfaces of said second magnet means.

6. The wet motor gerotor fuel pump of claim 5, wherein said magnet spacing means comprises keeper means separating one of said first and second side surfaces of said first magnet means from one of said first and second side surfaces of said second magnet means to define an axial flow passage between said gerotor pump means and said outlet housing means and between said first and second magnet means substantially along said flow axis;
whereby said axial flow passage allows fuel to be pumped about said armature means and to thereby improve pumping efficiency and performance.

7. The wet motor gerotor fuel pump of claim 6, wherein said magnet spacing means further comprises spring means circumferentially biasing the other of said first and second side surfaces of said first magnet means from the other of said first and second side surfaces of said second magnet means to establish a second axial flow passage extending along said flow axis between said first and second magnet means.

8. A wet motor gerotor fuel pump for pumping fuel from a fuel source to an internal combustion engine comprising:
a pump case having one end, an opposite end and a flow axis therethrough, said pump case further comprising an inlet end bore at said one end adapted to communicate with said fuel source;
a narrow conduit inlet chamber adjacent said inlet end bore;
a motor chamber located in said opposite end of said pump case;
a pump chamber having a body portion substantially larger than said narrow conduit inlet chamber, said pump chamber being interposed said motor chamber and said inlet chamber;
first means for sealing said pump case, said first means for sealing located at said opposite end of said pump case;
inlet housing means mounted in said pump chamber, said inlet housing means comprising an annular hub protruding into said narrow conduit inlet chamber, said annular hub and said narrow conduit inlet chamber defining a flow channel therebetween, said inlet housing means further comprising a gerotor cavity about a gerotor axis located parallel to and displaced a predetermined distance in an eccentric radial direction from said flow axis;
outlet housing means having pump outlet means adapted to be communicated with said internal combustion engine and further comprising a second means for selaing coupled to said first means for sealing;
electric motor means comprising armature means comprising an armature shaft having a first end rotatably supported at said outlet housing means, said armature shaft further having a second end rotatably supported at said inlet housing means, said armature means further comprising drive hub means mounted to said armature shaft, said drive hub means having first tang means extending in a first radial direction relative to said armature shaft;
gerotor pump means located in said gerotor cavity, said gerotor pump means comprising an inner pump gear, an outer pump gear, and second tang menas located on one of said inner and outer pump gears, said second tang means further extending in a second radial direction radially offset from said first radial direction and forming a driving connection with said first tang means such that said fuel pump pumps fuel from said fuel source into said narrow conduit inlet chamber, through said gerotor pump means past said electric motor means into said outlet housing means substantially along said flow axis to said internal combustion engine, said driving connection between said second tang means and said first tang means allowing for end-to-end self-alignment between said armature shaft and said one of said inner pump gear and said outer pump gear; and bushing means resiliently interposed said second end of said armature shaft and said annular hub of said inlet housing means, said bushing means rotatably supporting said second end of said armature shaft to permit some self-alignment of said armature shaft with respect to said gerotor pump means.

9. The wet motor gerotor fuel pump according to claim 8, wherein said annular hub has a bore that has an inner diameter, wherein said bushing means has an outer diameter that is radially aligned with said inner diameter of said bore of said annular hub, said inner diameter of said bore of said annular hub being greater than said outer diameter of said bushing means, and further comprising:

an O-ring extending between said outer diameter of said bushing means and said inner diameter of said bore of said annular hub.

10. The wet motor gerotor fuel pump according to claim 9, wherein said annular hub further comprises an annular shoulder extending radially inwardly from said annular hub wherein said bushing means further comprises an annular shoulder extending radially inwardly from said outer diameter of said bushing means, wherein said annular shoulder of said annular hub is spaced along said flow axis from said annular shoulder of said bushing means and wherein said O-ring is trapped between said annular shoulder of said annular hub and said annular shoulder of said bushing means.

* * * * *

UNITED STATES PATENT AND TRADEMARK OFFICE
CERTIFICATE OF CORRECTION

PATENT NO. : 4,662,827

DATED : May 5, 1987

INVENTOR(S) : Michael V. Wiernicki

It is certified that error appears in the above-identified patent and that said Letters Patent is hereby corrected as shown below:

In The Specifications

Column 1, line 41, delete "puaping" and insert ---- pumping ----.

Column 2, line 66, after "is" insert a comma ---- , ----.

Same line, after "therefore" insert a comma ---- , ----.

Column 4, line 35, delete "ventrelief" and insert ---- vent-relief ----.

Column 6, line 14, delete "diametricallyopposed" and insert ---- diametrically-opposed ----.

Column 6, line 54, delete "puap" and insert ---- pump ----.

Column 6, line 56, delete "slipfittingly" and insert ---- slip-fittingly ----.

Column 10, line 31, delete "unload" and insert ---- unloaded ----.

Column 10, line 43, after "imperfect" delete the comma ",".

Column 11, line 15, after "is" insert a comma ---- , ----.

Same line, after "thus" insert a comma ---- , ----.

Column 11, line 51, after "tubular" insert ---- portion ----.

Column 12, line 20, delete "18" and insert ---- 19 ----.

UNITED STATES PATENT AND TRADEMARK OFFICE
CERTIFICATE OF CORRECTION

PATENT NO. : 4,662,827

DATED : May 5, 1987

INVENTOR(S) : Michael V. Wiernicki

It is certified that error appears in the above-identified patent and that said Letters Patent is hereby corrected as shown below:

In The Specifications

Column 12, line 42, delete the line in its entirety.

Column 12, line 43, delete "ting, and".

Column 13, line 34, delete "radical" and insert ---- radial ----.

Column 13, line 39, after "therefore" insert a comma ---- , ----.

Column 13, line 41, delete "radical opposite" and insert ---- opposite radial ----.

Column 13, line 44, after "therefore" insert a comma ---- , ----.

Column 14, line 9, delete "upper" .

Same line, after "the" first occurence insert ---- upper ----.

In The Claims

Column 14, line 28, after "combustion" insert ---- engine ----.

Column 14, line 40, after "narrow" insert ---- conduit ----.

UNITED STATES PATENT AND TRADEMARK OFFICE
CERTIFICATE OF CORRECTION

PATENT NO. : 4,662,827

DATED : May 5, 1987

INVENTOR(S) : Michael V. Wiernicki

It is certified that error appears in the above-identified patent and that said Letters Patent is hereby corrected as shown below:

In The Claims

Column 16, line 40, delete "selaing" and insert ---- sealing ----.

Column 16, line 54, delete "menas" and insert ---- means ----.

Signed and Sealed this

Eighth Day of December, 1987

Attest:

DONALD J. QUIGG

*Attesting Officer*     *Commissioner of Patents and Trademarks*